G. LIÉBEAUX & F. HENNEBIQUE.
REINFORCED CONCRETE SLEEPER FOR RAILWAYS AND TRAMWAYS.
APPLICATION FILED MAY 6, 1907.
911,734.
Patented Feb. 9, 1909.
2 SHEETS—SHEET 1.
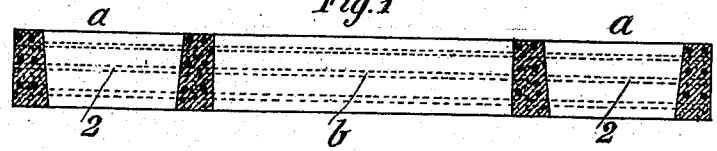
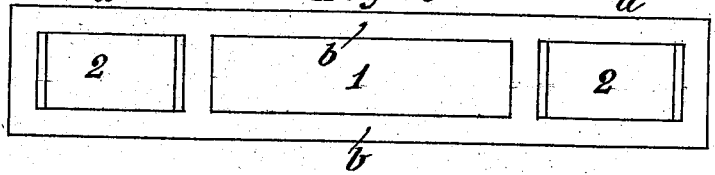
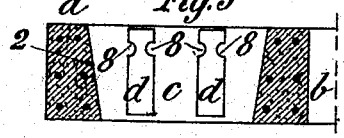
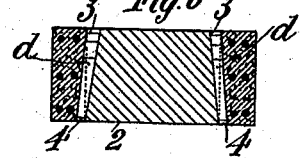
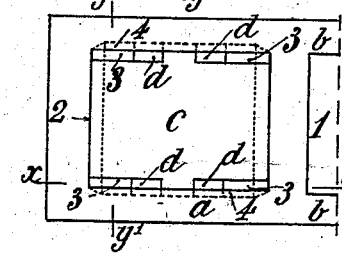
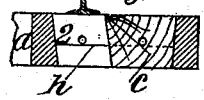
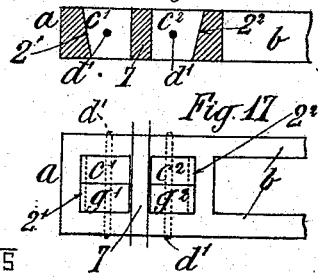
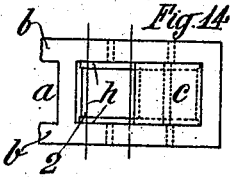
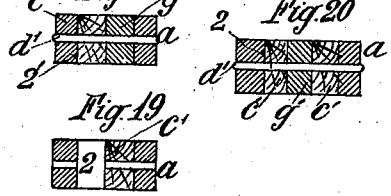
Witnesses
Ethel Edwards.
E. C. Thompson.
Inventors
Gaston Liébeaux
François Hennebique
By Edward P. Thompson G. LIÉBEAUX & F. HENNEBIQUE.
REINFORCED CONCRETE SLEEPER FOR RAILWAYS AND TRAMWAYS.
APPLICATION FILED MAY 6, 1907.
911,734.
Patented Feb. 9, 1909.
2 SHEETS—SHEET 2.
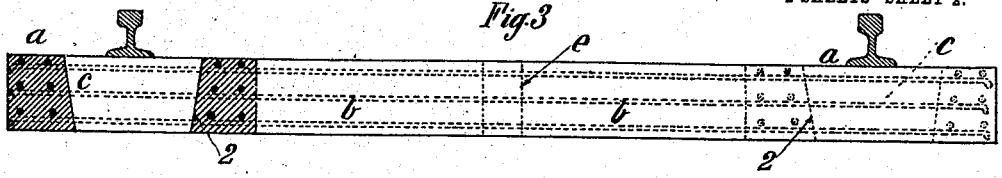
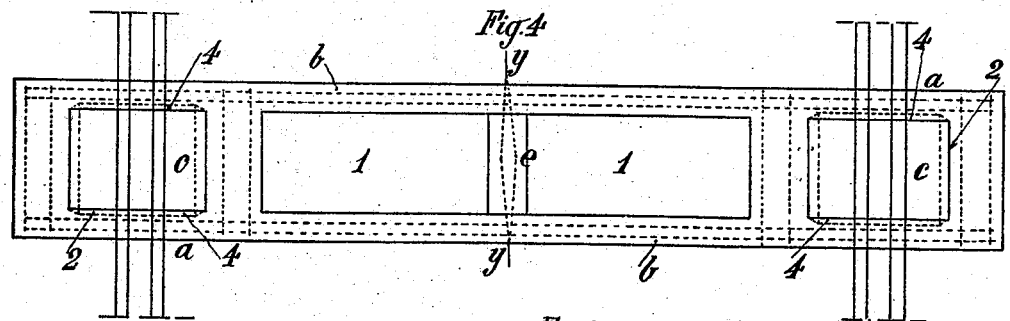
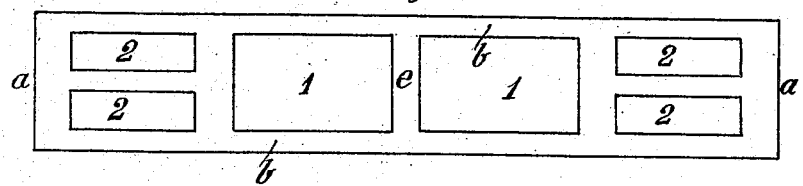
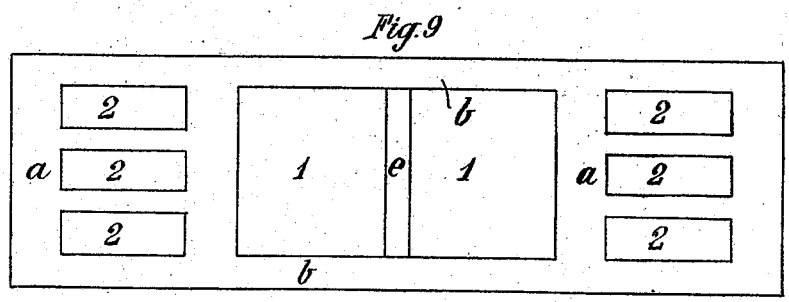
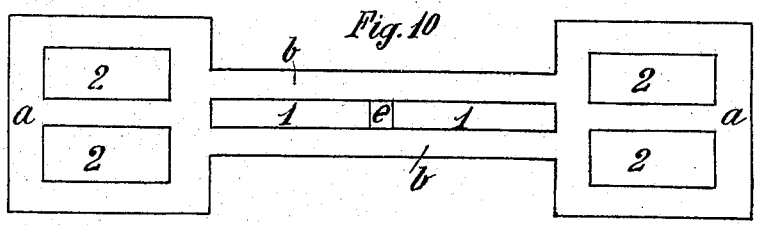
Witnesses
Ethel Edwards.
E. C. Thompson
Inventors
Gaston Liébeaux
François Hennebique
By Edward P. Thompson

UNITED STATES PATENT OFFICE.

GASTON LIÉBEAUX, OF NANTES, AND FRANÇOIS HENNEBIQUE, OF PARIS, FRANCE.

REINFORCED CONCRETE SLEEPER FOR RAILWAYS AND TRAMWAYS.

No. 911,734.      Specification of Letters Patent.      Patented Feb. 9, 1909.

Application filed May 6, 1907. Serial No. 372,078.

*To all whom it may concern:*

Be it known that we, GASTON LIÉBEAUX and FRANÇOIS HENNEBIQUE, citizens of the Republic of France, residing at Nantes and Paris, respectively, both in the Republic of France, have invented certain new and useful Improvements in Reinforced Concrete Sleepers for Railways and Tramways, of which the following is a specification.

This invention consists of a reinforced concrete or reinforced beton sleeper for railways and tramways.

The sleeper is formed of two heads connected together by cross-stayed sides or walls, or otherwise, each of these heads being provided directly opposite the place where the rail fits, with one or more cells or slots traversing the head from top to bottom and being open.

A perfectly determined resistant support is given to the sleeper at the moment when it is laid, by arranging beneath it, more particularly beneath its two heads, a permanent foundation obtained by ramming through the vertical cells or slots hereinbefore mentioned the filling in material or subjacent ground, suitable materials being incorporated.

An easily removable block of wood or other suitable material intended to receive the ordinary parts for fixing the rail (treenails, chairs and the like), is arranged in the slot or slots of the heads when the sleeper is definitely laid, the said wooden block being retained on the sleeper by wedges, keys, spikes and the like, or any suitable kind of fastening.

The removable wood blocks are adapted to be in certain cases withdrawn from their slots, re-inserted or replaced on the spot, while the sleepers are in use, without having to disturb either the rails or the sleepers, and without having to touch the subjacent soil.

The invention is shown in the accompanying drawings to which reference will be made in the following specification:—

Figure 1 is a longitudinal section; and Fig. 2, a plan view of the improved sleeper; Figs. 3 and 4 are similar views of a sleeper the sides of which are interstayed and the slots of the heads of which are each provided with a block of wood held in place by wedges or vertical spikes or bolts; Fig. 5 is a longitudinal section on an enlarged scale of a sleeper head with block of wood and wedges or vertical bolts; Fig. 6, a transverse section; and Fig. 7, a plan view; Fig. 8, 9 and 10 show on a reduced scale sleepers of various forms and sizes arranged under the same conditions as those of Figs. 1 and 2; Figs. 11–20 represent the means designed for lodging and retaining the wood blocks in the slots of the heads of the sleeper so as to render them capable of being removed without disturbing either the rails, the sleeper, or the prepared ground, or otherwise, beneath this sleeper.

This improved sleeper has two heads $a$ of reinforced concrete above which the rails of the track are intended to pass, these heads $a$ being connected the one with the other by the intermediary of two sides or walls $b$ also of reinforced concrete, so as to form a very rigid structure.

In the heads $a$ one or more slots 2 are provided, traversing the heads from top to bottom. These open slots are utilized for laying the sleeper, and receive, when the sleeper is in use, wooden blocks $c$ which are removable and are retained in place in any suitable way and on which the rails are fixed either directly or by the intermediary of chairs, but in any case in the way, and under the conditions, at present employed. It is evident that the sleeper constituted in the manner hereinbefore indicated may be laid exactly in the same way as a wooden sleeper. When it is brought into the position which it is intended to occupy, it is possible, owing to its special form and constitution, to insure for it a seat as firm as the traffic of the track may necessitate, the filling in material being rammed not only all around the heads $a$, as is done for wooden sleepers, but especially vertically through the recesses which the slots 2 form and so under the heads, and by incorporating with this filling suitable materials. This ramming of the filling which is operated vertically, preferably mechanically, allows not only of a perfectly firm foundation being given to the sleeper in proportion to the load which this latter will have to carry, but constitutes a foundation in which the sleeper is to some extent anchored, such anchoring being completed by the central recess 1 being entirely filled with the filling material.

Now if the sleeper shown in Figs. 1 and 2 be supposed to be laid in the manner hereinbefore indicated, in order to fix the rails on this sleeper, the slots 2 are first of all provided with blocks of wood $c$. As shown in the drawing the slots 2 provided in the heads $a$ and also the wood blocks $c$ which are secured therein, are of longitudinal trapezoidal section and a horizontal rectangular section. The width of the wood blocks $c$ which is of course variable, must however be sufficient to allow the removal of the rail fastener with a view to the employment of the sleeper on curves, or for the maintenance of the track, or for any other reason.

Various means may be utilized for retaining the blocks $c$ in their position. Figs. 3–7 of the drawings show the application of metal wedges $d$ arranged vertically in quite a special manner in order to form bolts. Figs. 11–20 represent another method of fixing the blocks $c$ by means of horizontal spikes or bolts $d'$.

In the arrangement shown in Figs. 3–7 the fibers of the wood blocks $c$ are directed longitudinally and these blocks are gripped transversely by means of vertical wedges $d$ of steel of some centimeters in width, which insure their being secured on the sleeper. The wedges $d$ are put in place from above, they are driven by force into the grooves 3—4 which are also wedge shaped, and formed partly in the heads $a$ of the sleeper, and partly in the faces of the blocks $c$. These grooves 3 in the blocks $c$ are deep on the upper face and taper down to the lower face; on the contrary in the head of the sleeper, the grooves 4 are deep in the lower part and taper away towards the upper face of the sleeper. In order to facilitate the fixing and withdrawal of the wedges $d$, the grooves 3—4 extend over a suitable width. The said wedges also have, for the same object, notches 8 (Fig. 5). It is not indispensable that the heads $a$ should be each of them provided with a single slot 2; for sleepers more particularly intended for heavy traffic lines, two or three identical slots 2 may be provided in the heads $a$. Figs. 8, 9 and 10 represent sleepers thus formed. For these sleepers one or more blocks of wood $c$ in the slots 2 may be utilized if desired without inconvenience beneath each rail. With these sleepers if, what is almost impossible, one of them should become loose, it is always easy to reëstablish its firm seat by external packing and by ramming filling into its recesses which have remained free. If it be necessary to replace one or more blocks of wood $c$, which operation will only be necessary at very long intervals, this replacement is done after the rails have been detached. However by reason of the advantages of resistance, preservation and consequently durability afforded by tracks laid with the aid of the system of sleeper hereinbefore described, which advantages result from the vertical ramming in each of the heads, it is considered that it would be most advantageous to provide the slots 2 with wood blocks capable of being put in position, withdrawn and replaced or others substituted, without having to disturb either the rails or the sleeper, and without having to move the adjacent ground.

Figs. 11–20 of the drawings show the means provided for lodging and retaining in the slots 2 blocks of wood $c$ which are easily removable, without disturbing either the rails, which pass above the said blocks, or the sleepers or the ground, whether specially prepared or not, beneath the sleepers.

From the foregoing it is evident that, in all cases, the blocks $c$ when they are in use are placed directly below the rails, which position they necessarily occupy seeing they receive the treenails or other means for fixing these rails.

According to the arrangement shown in Figs. 11–15, more particularly intended for tracks laid with vignole rails, the slot 2 (or the slots) provided in each of the heads $a$ of the sleeper receives a block of wood $c$ which does not completely fill it. The lateral faces of this block $c$ and one of its longitudinal faces are indeed in contact with the corresponding walls of the said slot 2 (Figs. 11 and 12), but in continuation of its other longitudinal face this slot 2 is prolonged to a sufficient extent to allow of a block or wedge $g$ of reinforced concrete being able to be juxtaposed to the block of wood $c$ which assists its maintenance in the desired position. Of course the wedge $g$ may be in the interior or exterior of the track as preferred. In Figs. 11 and 12 the blocks $c$ and $g$ instead of being maintained by wedges are solidly fixed in the sleeper by means of keys $d'$ of any suitable section, either prismatic, cylindrical or slightly conical. In order to form a bolt, these keys or spikes $d'$ must pass both through the block or wedge and the walls of the head $a$, which are perforated for this purpose.

Owing to the arrangement shown in Figs. 11–15 it will be evident that it is easy to proceed to replace a block $c$ without disturbing either the rail or the sleeper. In fact in order to attain this result, it suffices after having unscrewed the treenails or other means of fixing the rail, to remove the spikes $d'$, withdraw the wedge $g$ then slip in its place the block $c$ as is shown in Figs. 13 and 14, after which this block may be easily withdrawn. By proceeding in the reverse way the placing in position of a fresh block $c$ is equally easily effected.

According to the arrangement shown in Figs. 16–20 of the drawings, which is preferably applicable to double headed rails held in chairs, the slots 2 are divided into two parts 2′ and 2², by a transverse partition 7 forming part of the structure of the sleeper. In each of the small slots 2′, 2², a block of wood $c'$ or $c^2$ and a block or wedge of reinforced concrete, $g'$ or $g^2$, are located side by side, and both retained in their position by one or more keys or spikes $d'$.

As Figs. 17 and 18 show in each slot 2′, 2², the blocks $c'$, $g'$ and $c^2$, $g^2$ are juxtaposed. Naturally these wood blocks $c'$ and $c^2$ alone receive the means for fixing the chair or the rail. It is easy to imagine how with such an arrangement the replacement of these wood blocks is effected without disturbing the rails or the sleepers. After having removed the means for fixing the chairs or rails as well as the spikes $d'$, the wedges $g'$, $g^2$, are raised out of their place on each side of the rail, the adjacent blocks of wood $c'$, $c^2$, are slipped into their places as shown in Fig. 19 in order to withdraw them in their turn. A series of reverse operations of course enables fresh blocks of wood to be inserted. When on the same sleeper (double sleeper or joint sleeper) two series of chairs are fixed, the parts 2′ and 2² of the slots are wider and then comprise two blocks of wood $c$ corresponding to each chair; between these blocks $c$ a single wedge of reinforced concrete $g$ is arranged. With this modification the replacement of the blocks $c$ is effected by first removing the wedge $g$ and successively bringing the said blocks in its place, in order then to withdraw them. The insertion of these blocks is obtained by a reverse operation as for the other arrangements.

It is important to note that the lodgment of the blocks $c$, that is to say each slot 2 has preferably a shoulder $h$ on one or more of its faces as shown in Figs. 11 and 15 which is intended to form a support for said blocks. In the drawings the shoulder is not indicated for all the sleepers represented in order to leave the necessary clearness in the drawings, but it is evident that this shoulder might exist in all the slots 2 without changing anything which has been hereinbefore stated.

For tramway and other like tracks the heads $a$ are utilized with removable wood blocks of the system of sleeper hereinbefore described, these heads being embedded in the ground to support the rails which are interconnected as usual.

We declare that what we claim is:—

1. In a sleeper of reinforced concrete two heads, rail receiving blocks, locking blocks, means in said heads for receiving said rail receiving blocks and locking blocks.

2. In a sleeper of reinforced concrete, two heads, rail receiving blocks, locking blocks, means in said heads for receiving said rail receiving blocks and locking blocks, means for holding both said blocks in said receiving means.

3. In a reinforced concrete sleeper, two heads each provided with a slot from top to bottom a rail receiving block located in the slot of each head, a rail on said block, means for removing said blocks without disturbing said rails.

4. In a reinforced concrete sleeper, two heads having each a rail supporting block receiving slot, rail supporting blocks, ferroconcrete blocks holding said rail receiving blocks in position, spikes or keys for holding said blocks in position.

5. In a reinforced concrete sleeper, two heads having stepped slots therein passing from top to bottom thereof, rail receiving blocks in the slots of said heads, means for locking said blocks in position.

6. In a reinforced concrete sleeper, two heads having slots therein, longitudinal webs or walls connecting said heads, strengthening means between said webs or walls.

7. In a reinforced concrete sleeper, two heads having slots passing vertically therethrough and constricted towards the bottom, rail receiving blocks located in said slots, means for locking said rail receiving blocks in position.

In witness whereof, we have hereunto signed our names this 15th day of April 1907, in the presence of two subscribing witnesses.

GASTON LIÉBEAUX.
FRANÇOIS HENNEBIQUE.

Witnesses:
ALPHONSE MÉJÉAN,
H. C. COXE.